United States Patent
Colombo et al.

(10) Patent No.: US 10,852,450 B2
(45) Date of Patent: Dec. 1, 2020

(54) REFRACTION-BASED SURFACE-CONSISTENT AMPLITUDE COMPENSATION AND DECONVOLUTION

(71) Applicant: Saudi Arabian Oil Company, Dhahran (SA)

(72) Inventors: Daniele Colombo, Dhahran (SA); Diego Rovetta, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 222 days.

(21) Appl. No.: 15/585,431

(22) Filed: May 3, 2017

(65) Prior Publication Data

US 2018/0321405 A1 Nov. 8, 2018

(51) Int. Cl.
*G01V 1/36* (2006.01)
*G01V 1/30* (2006.01)

(52) U.S. Cl.
CPC ............. *G01V 1/36* (2013.01); *G01V 1/307* (2013.01); *G01V 1/362* (2013.01); *G01V 2210/53* (2013.01); *G01V 2210/59* (2013.01)

(58) Field of Classification Search
CPC ...................................................... G01V 1/36
See application file for complete search history.

(56) References Cited

U.S. PATENT DOCUMENTS

| | | | |
|---|---|---|---|
| 4,695,984 A | 9/1987 | Paal | |
| 6,278,950 B1 | 8/2001 | Kim et al. | |
| 8,441,891 B2 | 5/2013 | Ferber et al. | |
| 10,067,255 B2 | 9/2018 | Colombo et al. | |
| 2006/0247860 A1* | 11/2006 | Angerer | G01V 1/364 702/14 |
| 2013/0176820 A1 | 7/2013 | Le Meur et al. | |
| 2014/0200817 A1 | 7/2014 | Garceran | |
| 2017/0176617 A1 | 6/2017 | Colombo et al. | |

OTHER PUBLICATIONS

Cambois et al., "Surface-consistent deconvolution in the log/Fourier domain," Geophysics, Society of Exploration Geophysicists, vol. 57, No. 6, Jun. 1992, 18 pages.
Levin, "Surface-consistent deconvolution," Geophysics, vol. 54, No. 9, Sep. 1989, pp. 1123-1133.
Zhang et al., "Quality Control of Consistent Deconvolution on Land Dynamite Data," The Leading Edge, Society of Exploration Geophysicists, vol. 34, No. 4, Apr. 2015, pp. 430-432, 434-436.

(Continued)

*Primary Examiner* — John E Breene
*Assistant Examiner* — Jeffrey C Morgan
(74) *Attorney, Agent, or Firm* — Fish & Richardson P.C.

(57) ABSTRACT

A method for refraction-based surface-consistent amplitude compensation and deconvolution includes receiving seismic traces, the seismic traces generated using at least one source and at least one receiver; calculating an amplitude residual for each seismic trace; determining surface-consistent amplitude residuals for the at least one source and the at least one receiver based on the amplitude residual for each seismic trace; and performing surface-consistent amplitude correction to each seismic trace by applying the determined surface-consistent amplitude residuals for the at least one source and the at least one receiver.

20 Claims, 10 Drawing Sheets

(56) References Cited

OTHER PUBLICATIONS

Cary et al., "Four-component surface-consistent deconvolution," Geophysics, vol. 58, No. 3, Mar. 1993, pp. 383-392.

Van Vossen et al., "Surface-consistent deconvolution using reciprocity and waveform inversion", Geophysics, vol. 71, No. 2, Mar.-Apr. 2006, pp. V19-V30.

Li et al., "Research and application of surface-consistent relative Q calculation and compensation," CPS/SEG Beijing International Geophysical Conference & Exposition, Apr. 21-24, 2014, pp. 246-248.

White et al., "Deconvolution of Refraction Seismograms from Large Underwater Explosions," Geophysics, vol. 37, No. 3, Jun. 1972, pp. 431-444.

Kirchheimer, "Robust Surface-Consistent Deconvolution with Noise Suppression," SEG International Exposition and Annual Meeting, San Antonio, Texas, Sep. 9-14, 2001, 4 pages.

Burnstad, "New Concepts in Quality Control for 3D Near Surface Modeling," SEG Houston 2009 International Exposition and Annual Meeting, pp. 3203-3207.

Palmer, "Refraction Traveltime and Amplitude Corrections for Very Near-Surface Inhomogeneities," Geophysical Prospecting, European Association of Geoscientists & Engineers, vol. 54, No. 5, Sep. 2006, pp. 589-604.

Colombo et al., "Fully automated near-surface analysis by surface-consistent refraction method," Geophysics vol. 81, No. 4, Jan. 9, 2015, 11 pages.

Taner et al., "Static Corrections: Time Amplitude and Phase," SEG Conference, Nov. 13, 1991, 3 pages.

Taner et al., "Surface consistent corrections," Geophysics vol. 46, No. 1, Jan. 1, 1981, 6 pages.

International Search Report and Written Opinion issued in International Application No. PCT/US2018/029324 dated Aug. 1, 2018, 16 pages.

* cited by examiner

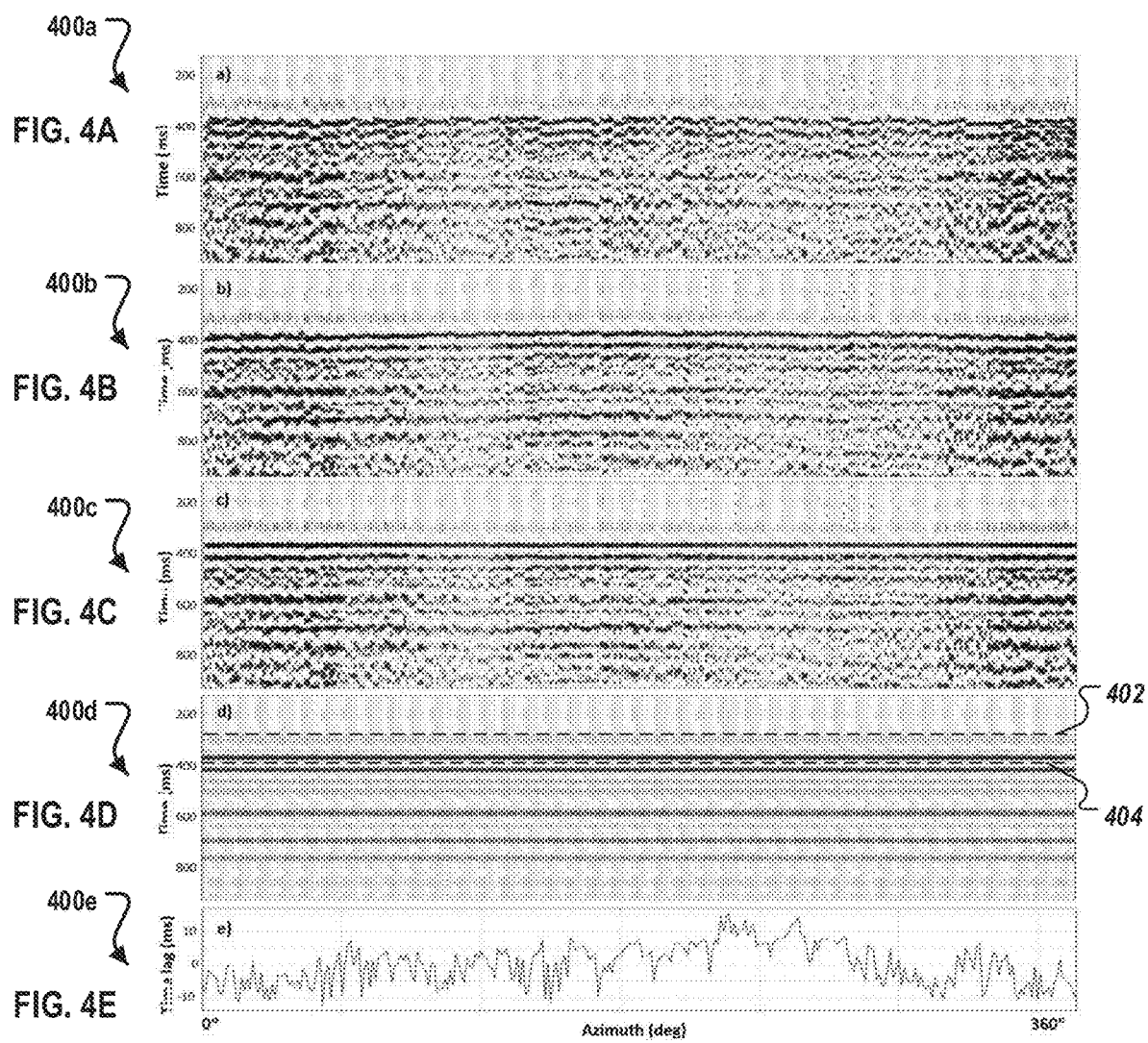

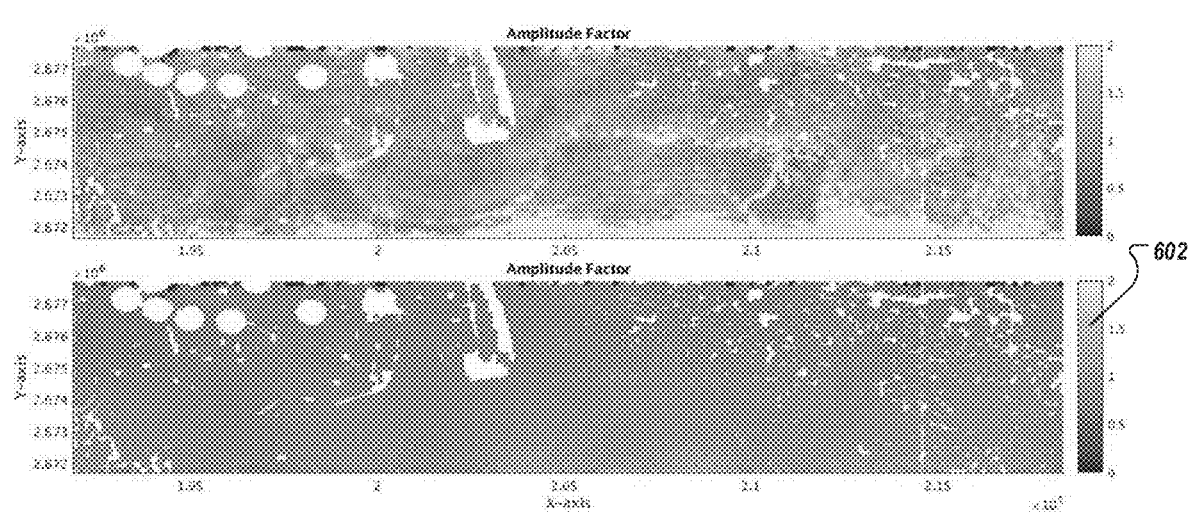

REFRACTION-BASED SURFACE-CONSISTENT AMPLITUDE COMPENSATION AND DECONVOLUTION

TECHNICAL FIELD

This disclosure relates to seismic data processing.

BACKGROUND

Seismic data are used in exploration to define geometries of geological structures, and aid interpreters to understand rock properties and predict prospects to be drilled. Surface-consistent seismic processing is directed at preserving signal amplitudes (reflectivity) to remove imprint caused by variability of elastic parameters in the near surface and to recover true reflectivity at depth. The reflectivity information can be used to understand rock properties.

Reflection seismic processing typically uses surface-consistent deconvolution and amplitude compensation to remove near-surface effects for recovering the true reflectivity at depth. Estimate of the true reflectivity at a common subsurface reflection point is affected by variable elastic parameters and attenuation effects caused by the shallow layers of the earth (the near surface) which act as a filter (in amplitude and frequency) to the seismic waves that travel through the near surface. Processes such as seismic inversion for rock characterization are not effective if the inverted amplitudes are a mixture of subsurface reflectivity and variable near surface effects. For a quantitative interpretation of seismic data, separating and eliminating the near-surface effects from the reflectivity information is important.

SUMMARY

The present disclosure describes methods and systems, including computer-implemented methods, computer program products, and computer systems of refraction-based surface-consistent amplitude compensation and deconvolution.

In some implementations, seismic traces are received, where the seismic traces are generated using at least one source and at least one receiver. An amplitude residual is calculated for each seismic trace. Surface-consistent amplitude residuals are determined for the at least one source and the at least one receiver based on the amplitude residual for each seismic trace. Surface-consistent amplitude correction is performed to each seismic trace by applying the determined surface-consistent amplitude residuals for the at least one source and the at least one receiver.

The previously-described implementation is implementable using a computer-implemented method; a computer-readable medium (such as a non-transitory, computer-readable medium) storing computer-readable instructions to perform the computer-implemented method; and a computer-implemented system comprising a computer memory interoperably coupled with a hardware processor configured to perform the computer-implemented method/the instructions stored on the computer-readable medium.

The subject matter described in this disclosure can, in some implementations, provide enhanced reflectivity information by removing or reducing near-surface effects based on refracted waves. The described approach enables a use of land seismic data for reservoir characterization, which is typically difficult to achieve with conventional approaches. By compensating for near-surface variability, land seismic data can be used for generation of prospects in resource exploration and for reservoir studies in reservoir management and characterization. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIGS. 4A-4E illustrate steps for surface-consistent evaluation of statics for offset 700 m, according to some implementations.

FIGS. 6A-6B illustrate a comparison between an amplitude residual map evaluated at a central frequency of the data and a recalculated amplitude residual map evaluated at the central frequency after applying a deconvolution process using a refraction-based surface-consistent operator of the described approach, according to some implementations.

Like reference numbers and designations in the various drawings indicate like elements.

DETAILED DESCRIPTION

Figure 1:
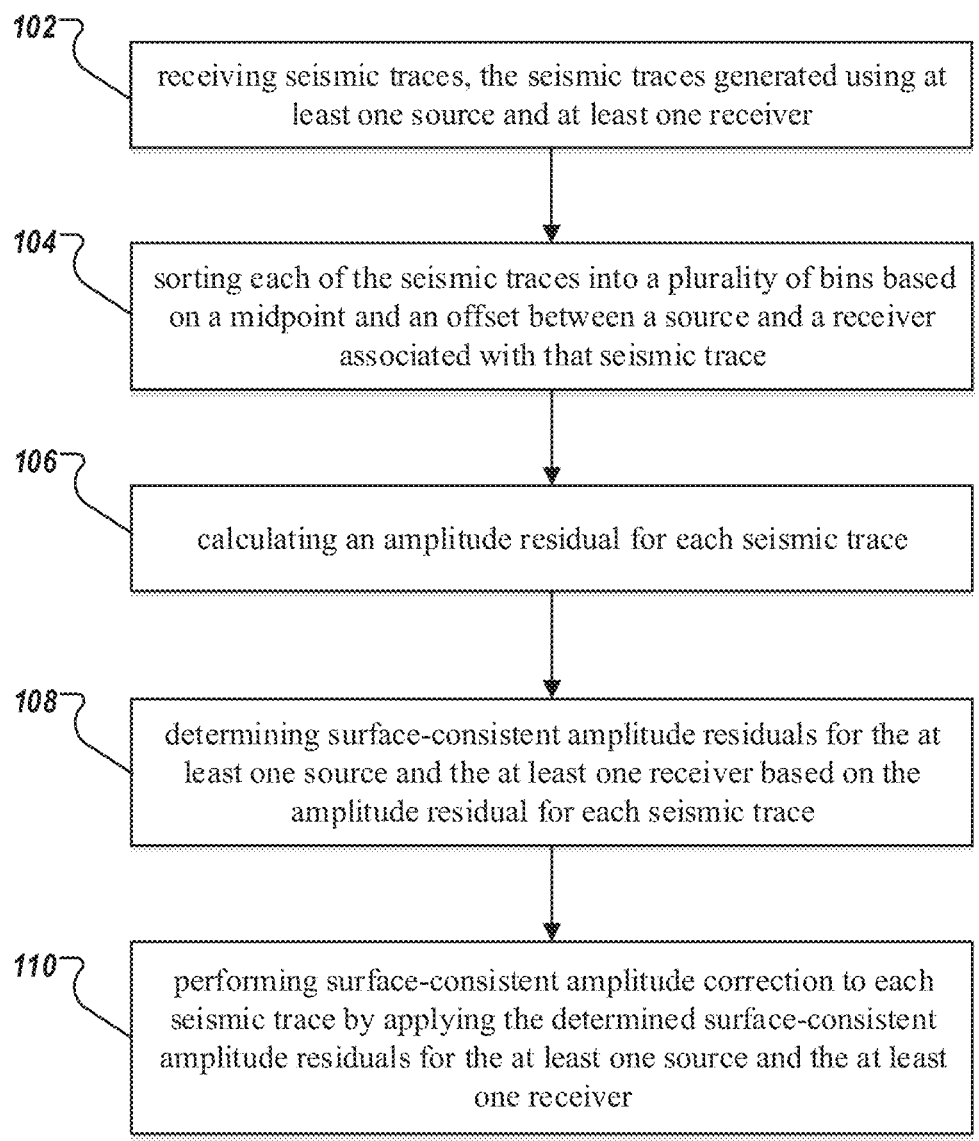
FIG. 1 is a flowchart of an example method for refraction-based surface-consistent amplitude compensation and deconvolution, according to some implementations.

The following detailed description describes a processing methodology for refraction-based surface-consistent amplitude compensation and deconvolution, and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from scope of the disclosure. Thus, the present disclosure is not intended to be limited to the described or illustrated implementations, but is to be accorded the widest scope consistent with the principles and features disclosed.

Seismic data can be used to provide reflectivity information of subsurface layers. For recovering true subsurface reflectivity, some existing reflection seismic processing methods use surface-consistent amplitude balancing (correction through a scalar) and deconvolution (frequency-dependent correction) to remove near-surface effects based on reflected waves. These existing methods are based on the assumption of a geometric common reflection midpoint (CMP) between sources and receivers where the traces are collected and reflected events are statistically analyzed to separate the near-surface effects from the reflectivity using a convolutional model of the propagation. However, in many cases the separation of the near-surface contribution from the subsurface reflectivity is not effective by using the existing methods because of limited sensitivity of the reflected phases (also called primaries) to the near surface, noise in the data, and possible presence of spurious phases such as multiples and converted modes that may alter the effectiveness of the operation. Reflected phases travel for a long path into the earth and a fraction of their path is in the problematic near surface thus providing limited sensitivity to the near-surface layer.

Surface-consistent seismic processing typically avoids digital processing steps that may cause alteration of amplitude contents of signals to preserve true reflectivity information. The surface-consistent processing can be based on a convolutional model of seismic wave propagation that can be written in a time domain as $$P_{ij}(t)=S_i(t)*R_j(t)*\Gamma_{ij}(t) \qquad (1)$$

where S is the source function, R is the receiver impulse response, $\Gamma$ is the Green's function, and *indicates convolution in time domain.

For preserving amplitudes, the existing reflection seismic processing typically sorts trace data in a CMP domain, approximating a common reflection point. By sorting in a CMP domain, the trace data can be assumed to represent subsurface properties (subsurface consistency) to be estimated by velocity analysis and removed from the data by normal moveout (NMO) correction before attempt is made for estimation of the source and receiver terms in Equation (1), which include variable components of the recorded trace data (surface consistency). The convolutional model in Equation (1) can include additional terms representing additional components (for example, offset and azimuth) and the solution can be sought in a log-frequency domain to reduce Equation (1) to a linear form. The process also separates the signal amplitude and phase into real and imaginary parts so that the two components can be analyzed and processed separately.

In the existing reflection seismic processing, standard surface-consistent static approaches use phase shifts to derive time shifts for the source and receiver components to correct residual misalignment of reflected events in a CMP gather. The surface-consistent amplitude processes use the same framework to derive amplitude corrections to be applied to the traces through a multiplication of a scalar or by evaluating a frequency-dependent operator and performing a surface-consistent deconvolution. The amplitude corrections applied to the traces have a scope to separate the amplitude contributions deriving from the near-surface effects from the amplitude contributions deriving from the reflectivity coefficients at the reflection point. If the process is performed accurately and without errors, the corrected amplitudes become the expression of the true reflectivity of the subsurface and can be used to evaluate reservoir properties and possibly the fluid content.

In the existing reflection seismic processing, several problems affect reliability of the surface-consistent amplitude balancing (or compensation) and deconvolution. Some problems are related to the noise that can be high with land seismic data. Other problems arise from the lack of sensitivity of deep reflected waves to the shallow (near-surface) interval, and from the simplifications and assumptions that are embedded in the poorly conditioned surface-consistent inversion solution. Yet, other problems may arise from the fact that amplitude evaluation at the CMP may be affected by additional waveforms that are not primary reflections, such as direct waves, surface waves, mode conversions, and internal multiples. These problems may undermine the accuracy of the derived surface-consistent operators. Decoupling the near surface from the rest of the propagation through a deterministic approach can be desirable.

At a high level, the described approach performs refraction-based surface-consistent amplitude compensation and deconvolution, which extends and adapts surface-consistent amplitude compensation and deconvolution typically used in reflection seismic processing to the domain of refracted waves. The described approach determines surface-consistent amplitude corrections (balancing and deconvolution) using refracted waves instead of reflected waves. Refracted waves travel in the near surface, thus are sensitive to the elastic parameter variations occurring in the near surface, have larger signal-to-noise ratios relative to reflected events, and are true primaries by definition. In fact, refracted events are the first seismic waveforms to be recorded in a seismogram and are not contaminated by any other spurious seismic phase, thus providing good estimates of complex parameter variability contained in the near surface. In other words, refracted waves are good candidates to robustly analyze the near surface effects and derive operators to separate the near-surface effects from the subsurface reflectivity.

The described approach uses a new sorting domain to sort seismic traces in mid-point, offset, and azimuth domains which enables analysis of relative amplitude variations with respect to a reference amplitude and the inversion for the surface-consistent components at each shot and receiver location. Based on the sorted traces, an amplitude residual can be generated for each trace base on a pilot trace. Using the amplitude residual of each trace, surface-consistent amplitude residuals for the sources and receivers can be determined by solving a linear equation. The surface-consistent amplitude residuals can be a single value (scalar) or a function of frequency (operator). The surface-consistent amplitude residuals can be applied to the traces through multiplication (scalar) or by dividing the seismic trace by the frequency-dependent operator in a frequency domain (deconvolution) so that the near-surface amplitude effects are compensated and the recovered signals represent an enhanced expression of the subsurface reflectivity.

In some implementations, seismic traces are received. The seismic traces can be generated using at least one source and at least one receiver. An amplitude residual can be calculated for each seismic trace. Surface-consistent amplitude residuals can be determined for the at least one source and the at least one receiver based on the amplitude residual for each seismic trace. Surface-consistent amplitude correction can be performed to each seismic trace by applying the determined surface-consistent amplitude residuals for the at least one source and the at least one receiver. In some cases, each of the seismic traces can be sorted into a plurality of bins based on a midpoint and an offset between a source and a receiver associated with that seismic trace, and the sorting can be further based on an azimuth angle of that seismic trace. The amplitude residual for each seismic trace can be calculated as follows: for each of the plurality of bins, a pilot trace can be generated based on the seismic traces in that bin and a time window around a first arrival event, and the amplitude residual for each seismic trace in that bin can be calculated based on the pilot trace. The first arrival event can be a refracted event. In some cases, the pilot trace for a bin can be generated based on the seismic traces in that bin and the time window around the first arrival event by summing the seismic traces in that bin during the time window and dividing by a number of seismic traces in that bin. The amplitude residual for each seismic trace can be calculated based on the pilot trace by calculating a ratio between an energy of that seismic trace and an energy of the pilot trace, or by calculating a ratio between an amplitude of that seismic trace and an amplitude of the pilot trace. The surface-consistent amplitude residuals for the at least one source and the at least one receiver can be a scalar or a function of frequency.

FIG. 1 is a flowchart of an example method 100 for refraction-based surface-consistent amplitude compensation and deconvolution, according to some implementations. For clarity of presentation, the description that follows generally describes method 100 in the context of the other figures in this disclosure. For example, method 100 can be performed by a computer system described in FIG. 10, or any suitable system, environment, software, and hardware, or a combination of systems, environments, software, and hardware as appropriate. In some implementations, various steps of method 100 can be run in parallel, in combination, in loops, or in any order.

The method 100 starts at block 102, where seismic traces of a target region are received. The target region can include one or more earth subsurface and near-surface layers. The seismic traces are generated by firing shots at different locations and recording received signals at multiple receivers. The recorded signal at one receiver corresponding to a single shot is called a trace.

Figures 2A, 2B:
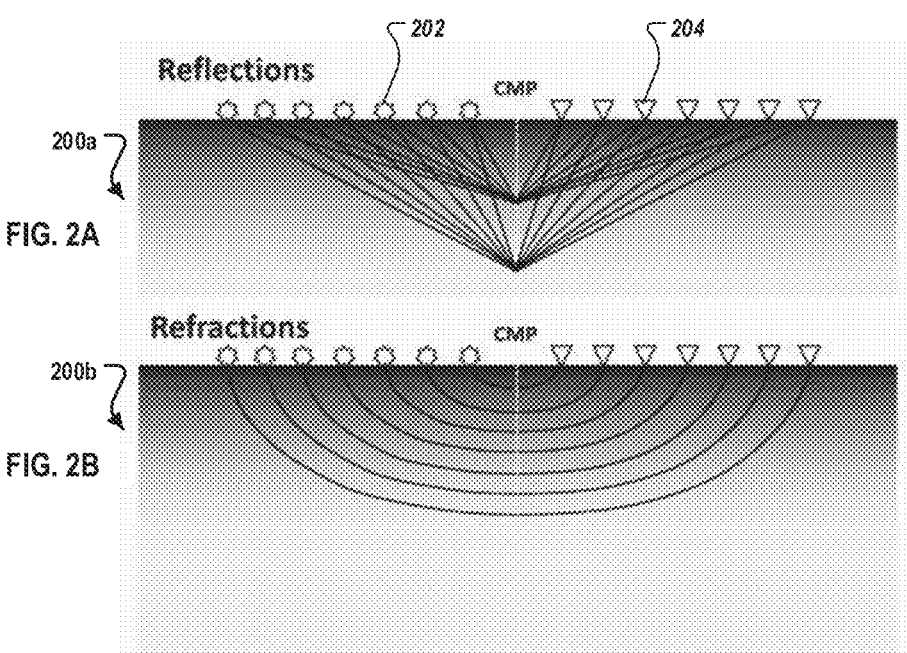
FIGS. 2A-2B show schematics of incident and reflected rays at a common midpoint (CMP) position compared to refracted ray paths, according to some implementations.

At block 104, the received seismic traces are sorted. The common midpoint (CMP) sorting domain (which is assumed to represent the common subsurface structure) developed for reflected waves can be applicable to a surface-consistent representation of refracted waves. For refracted waves, different from reflections, source-receiver pairs at different offsets, but sharing the same CMP, provide information about a different part of the structure with different depth and different velocity. For example, FIGS. 2A-2B show schematics of incident and reflected rays 200a at a CMP position compared to refracted ray paths 200b, according to some implementations. In the idealized one-dimensional model depicted in FIGS. 2A-2B (velocity increasing with depth), the offset between a shot source (for example, source 202) and a receiver (for example, receiver 204) is the main parameter controlling the depth of penetration of refracted waves.

For refracted waves, an effective and concise representation of the subsurface structure can be obtained by sorting or binning traces in a CMP-offset domain (XYO binning). After binning the received traces (or the first break picks), statistics can be calculated in each bin (for example, mean, median, mode, standard deviation, and cross-correlation). Multidimensional binning can be applied to a 3D dataset of seismic traces as shown in FIGS. 3A-3B.

Figure 3A:
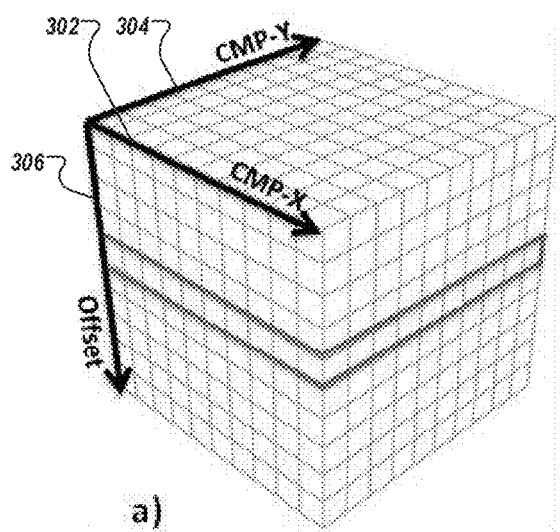
FIG. 3A illustrates sorting traces into CMP-offset bins, according to some implementations.
Figure 3B:
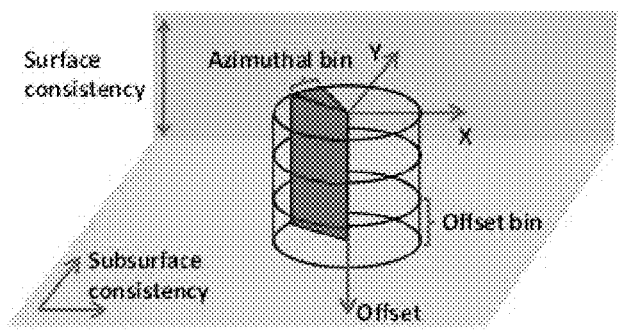
FIG. 3B illustrates sorting traces into CMP-offset-azimuth bins, according to some implementations.

FIG. 3A illustrates sorting traces into CMP-offset bins 300a, according to some implementations. The multi-dimensional attribute cubes or bins 300a can be a useful quality control tool as these cubes or bins enable a visualization of the spatial trends of the travel time (mean values) and the noisy areas (standard deviation). When performing the three-dimensional CMP-offset binning (that is, XYO binning in the directions of CMP-X 302, CMP-Y 304, and offset 306), the bin sizes in the CMP-X 302 and CMP-Y 304 directions can be kept large enough so that enough actual CMPs fall into a bin in order to provide significant statistics. The proposed XYO binning in FIG. 3A is different from the well-known sorting in a common offset domain as the latter collects data sharing a common offset but pertaining to different CMPs. The existing CMP sorting (time-offset) that applied for reflected waves is not useful for refracted waves as it would show events with variable velocities over the offset axis. The proposed XYO binning is therefore an effective representation of both CMP and offset domains where common properties at a CMP position can be quickly assessed.

In some implementations, as shown in FIG. 3A, the XYO space can be divided into XYO cubes or bins of a certain size. For example, each bin can have a size of 100 m in CMP-X direction, 100 m in CMP-Y direction, and 50 m in offset direction. For each trace (or first break pick), the offset (the distance between the source and the receiver) and the CMP (the middle point position between the source and the receiver) are determined, and the trace is sorted into a particular bin based on the offset and the CMP. Each XYO bin is a collection of traces sharing a common (or similar) midpoint position and a common (or similar) offset. The collection of traces in an XYO bin can also be called as an XYO gather.

As an additional dimension of binning, the XYO bin can be further divided in azimuthal sectors (XYOA bin) to provide an additional parameter to the analysis and to implement azimuth-dependent statistics. FIG. 3B illustrates sorting traces into CMP-offset-azimuth bins 300b, according to some implementations. The data collected in the CMP-offset-azimuth bin (XYOA bin) can provide structural information in the offset plane (subsurface consistency), while surface-consistent information can be evaluated by analyzing the data across the offset bins. Seismic traces can be sorted into XYOA bins so that each XYOA bin is a collection of traces sharing a common (or similar) midpoint position, offset, and azimuth. The collection of traces in an XYOA bin can also be called as an XYOA gather.

The resulting hypercube or bin in FIGS. 3A-3B provides efficient statistical analysis of large volumes of data across multiple domains. The seismic waveforms representing refracted events after application of statics (time shifts) show a sub-horizontal alignment in the XYO bin. The sub-horizontal alignment can be utilized for evaluating the amplitude residuals.

Turning back to FIG. 1, at block 106, an amplitude residual can be calculated for each trace. In some implementations, for each XYO or XYOA bin, a pilot trace can be calculated. For example, a pilot trace can be calculated from weighted stack of the traces collected in one XYO or XYOA gather and evaluated in a time window around the first arrival (that is, refracted event). In some cases, the pilot trace can be generated by summing the traces in the XYO or XYOA gather for each time sample and normalizing the sum by the number of traces in the gather. In some cases, the weighted stack of traces can be determined based on a noise level measure of each trace. For example, the noise level can be determined based on the standards deviation of the trace. During stacking, the traces of high noise levels can be weighted less and the traces of low noise levels can be weighted more. The spatial distribution of the pilot trace amplitude plotted for each offset slice of the XYOA hypercube provides a useful image of the amplitude variations in the near surface that can be used for quality control of the data or for deriving estimates of near-surface physical parameters.

FIGS. 4A-4E illustrate steps for surface-consistent evaluation of statics for offset 700 m, according to some implementations. FIG. 4A shows traces 400a sorted in XYO gathers and azimuth (XYOA). FIG. 4B shows traces 400b after residual linear move out (LMO) correction and long wavelength (field) statics are applied. FIG. 4C shows traces 400c after application of residual time lags estimated by means of cross correlation with a pilot trace obtained through weighted stack. FIG. 4D shows weighted stacks of traces 400d collected in the XYO gather evaluated in a time window centered around the first arrival, where the time window is illustrated by the dotted lines 402 and 404. In other words, FIG. 4D illustrates pilot traces of each XYOA gather at offset 700 m. FIG. 4E shows time lag residuals 400e resulting from the analysis.

Tuning back to FIG. 1, the amplitude residual for a particular trace can be calculated based on the pilot trace of the XYO or XYOA bin to which the particular trace belongs. The relative amplitude of each trace with respect to the pilot trace can be calculated to evaluate the residual amplitude corrections to be applied to the seismic data. The operation represents the "surface-consistent" approach where the trace relative amplitudes versus the pilot trace are inverted for the source and receiver terms of the convolutional model in Equation (1). The measure of the residual amplitude for each trace to be inverted for the surface-consistent terms (S and R in Equation (1)) can be obtained in various ways such as a measure of the absolute amplitude (for example, semblance), a stacked absolute amplitude, a stacked energy measure, and many other measures that one skilled in the art could define. The amplitude measure is evaluated relative to the amplitude measure of the pilot trace to generate the amplitude residual for each trace.

In some implementations, the amplitude residual for each trace can be calculated based on energy using the following equations:

$$x_{Sj} = \frac{1}{Nt} \sum_{m}^{Nt} x_{mj} \qquad (2)$$

$$E_{P1} = \sum_{j}^{Ns} x_{Sj}^2 \qquad (3)$$

$$E_{Sm} = \sum_{j}^{Ns} x_{mj}^2 \qquad (4)$$

$$Ar_m = \log(E_{Sm}/E_{P1}) \qquad (5)$$

where:
$x_{Sj}$=amplitude of stacked traces at time j (that is, amplitude of the pilot trace at time j)
$x_{mj}$=amplitude at time j for trace m
$N_t$=number of traces in the XYO gather to which trace m belongs
$N_s$=number of time samples
$E_{P1}$=energy of the pilot trace
$E_{Sm}$=energy of trace m
$Ar_m$=amplitude residual for trace m to be inverted for surface-consistency In some implementations, the amplitude residual for each trace can be calculated based on amplitude using the following equations:

$$x_{Sj} = \frac{1}{Nt} \sum_{m}^{Nt} x_{mj} \qquad (6)$$

$$A_{P1} = \sum_{j}^{Ns} |x_{Sj}| \qquad (7)$$

$$A_{Sm} = \sum_{j}^{Ns} |x_{mj}| \qquad (8)$$

$$Ar_m = \log(A_{Sm}/A_{P1}) \qquad (9)$$

where:
$x_{Sj}$=amplitude of stacked traces at time j (that is, amplitude of the pilot trace at time j)
$x_{mj}$=amplitude at time j for trace m
$N_t$=number of traces in the XYO gather to which trace m belongs
$N_s$=number of time samples
$A_{P1}$=amplitude of the pilot trace
$A_{Sm}$=amplitude of trace m
$Ar_m$=amplitude residual for trace m to be inverted for surface-consistency Other different measures of the amplitude residuals consistent with this disclosure can also be implemented. In some implementations, the pilot amplitude $A_{P1}$ can represent the pilot in the XYOA gather or a more general amplitude pilot measure such as of a combination of XYOA gathers. Such amplitude residuals can be intended as a scalar measure of the amplitude residual or as a frequency-dependent amplitude residual.

At block 108, based on the amplitude residual for each trace, surface-consistent amplitude residuals can be determined for sources and receivers. After the amplitude residuals $Ar_m$ are evaluated for all or a subset of all the traces, a large collection of amplitude residuals is obtained. Equation (1) can be rewritten in log/Fourier domain (linear form) as $$S_i + R_j + G_k = Ar_{ij}, \qquad (10)$$

where i is the source index, j is the receiver index, k is the index of the XYO bin related to the trace associated with source i and receiver j, $Ar_{ij}$ is the amplitude residual for the trace associated with source i and receiver j, $G_k$ represents an unknown subsurface term that accounts for subsurface-consistent amplitude variations and is solved together with the source and receiver terms.

Based on Equation (10), the following linear system can be formed:

$$Ax=r \qquad (11)$$

where r is a vector of amplitude residuals estimated in block 106, x is an unknown vector formed by $S_i$, $R_j$ and $G_k$, and A is a matrix that is dependent on the survey geometry. The number of columns in A is the sum of the number of sources ($N_S$), the number of receivers ($N_R$), and the number of XYO bins ($N_{XYO}$), and the number or rows in A corresponds to a total number of traces used $N_T$. In some cases, $N_T$ equals $N_S \times N_R$. The matrix A is highly sparse as it only contains three ones per row, indexing the source, receiver, and XYO bin which contribute to each amplitude residual. For example, $$x^T = [S_1 \ldots S_{N_S} \ R_1 \ldots R_{N_R} \ G_1 \ldots G_{N_{XYO}}] \quad (12)$$

$$r^T = [Ar_1 \ldots Ar_{N_T}] \quad (13)$$

$$A = \begin{bmatrix} 1 & 0 & \ldots & 0 & 1 & 0 & \ldots & 0 & 1 & 0 & \ldots & 0 \\ 1 & 0 & \ldots & 0 & 0 & 1 & \ldots & 0 & 1 & 0 & \ldots & 0 \\ \ldots & \ldots & \ldots & \ldots & \ldots & \ldots & \ldots & 0 & \ldots & \ldots & \ldots & 0 \\ 0 & 0 & \ldots & 1 & 0 & 0 & \ldots & 1 & 0 & 0 & \ldots & 1 \end{bmatrix} \quad (14)$$

where T represents transpose operation, and elements $S_1 \ldots S_{N_S}$ and $R_1 \ldots R_{N_R}$ in x represent surface-consistent amplitude residuals for sources and receivers. In Equation (14), the first row (corresponding to amplitude residual $Ar_1$) represents a trace with i=1,j=1, and located in the offset bin k=1; the second row (corresponding to amplitude residual $Ar_2$) represents a trace with i=1, j=2, and k=1; and the last row (corresponding to amplitude residual $Ar_{N_T}$) represents a trace with i=$N_S$, j=$N_R$, and k=$N_{XYO}$.

Equation (11) can be solved using a damped weighted least squares algorithm. For example, the unknown vector x can be solved by $$\hat{x} = (A^T W A + \lambda D)^{-1} A^T W r \quad (15)$$

where the diagonal matrix W includes correlation coefficients of each trace with respect to the pilot trace, which is a good estimate of the reliability of that particular data point. The damping matrix D, also diagonal, enables Equation (11) to be solved and prevents noise corrupting estimations of poorly resolved unknown parameters. The diagonal elements in D can be dimensioned in order to apply a smaller amount of damping to the source and receiver amplitude residuals (the first Ns+Nr terms in the unknown vector x) with respect to the $G_k$ terms. The values of the diagonal elements in the damping matrix D and the value of the weight k can be assigned by a user. Even if the matrix and vector sizes in Equation (15) can become large (billions of rows, hundreds of thousands of columns), the system is highly sparse and Equation (15) can be efficiently solved with modern parallel sparse solvers.

The surface-consistent amplitude residuals for sources and receivers can be a scalar or a function of frequency. For example, Equation (15) can be generalized to $Ax(\omega)=r(\omega)$, where $\omega$ is the frequency, and Equation (15) can be evaluated frequency-by-frequency to form frequency-dependent operators $S_i(\omega)$ and $R_j(\omega)$.

The described inversion procedure is one of the inversion methods (deterministic or stochastic) that can be implemented to derive the surface-consistent source and receiver (S and R) relative amplitude terms. As will be understood by those of ordinary skill in the art, other inversion methods consistent with this disclosure can also be used.

At block 110, surface-consistent amplitude correction is performed for each trace by using the surface-consistent amplitude residuals for sources and receivers obtained at block 108. If the surface-consistent amplitude residuals are scalars, the scalars are applied back to each trace as a multiplication factor. For example, if the trace is associated with source i and receiver j, the amplitude of the trace can be corrected by dividing the trace by the corresponding $S_i$ and $R_j$. If the surface-consistent amplitude residuals are frequency-dependent values, the frequency-dependent operators $S_i(\omega)$ and $R_j(\omega)$ can be applied to the traces through a deconvolution process (for example, dividing the trace by $S_i(\omega)$ and $R_j(\omega)$ in a frequency domain), so that the amplitude of the trace is corrected and near-surface effects are removed.

Figures 5A, 5B:
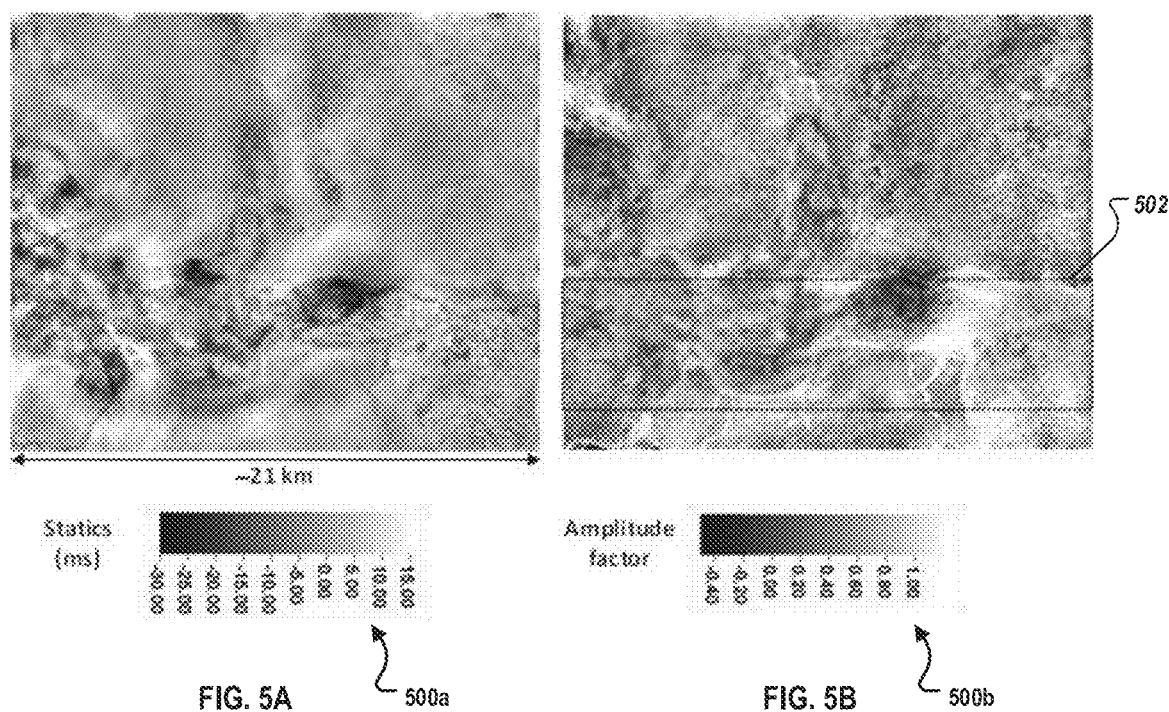
FIGS. 5A-5B illustrates a comparison between a surface-consistent static residual map (delta-times) and a residual scalar amplitude map computed using the described approach, according to some implementations.

The described approach is applied to a complex land dataset of an area presenting a structure-controlled wadi depression. FIGS. 5A-5B illustrates a comparison between a surface-consistent static residual map (delta-times) 500a and a residual scalar amplitude map 500b computed using the described approach, according to some implementations. The two images 500a and 500b present a structural similarity but with differences in details and in the distribution of the anomalies. This suggests that the two parameters (shallow velocity and amplitude) are related to each other but present variable sensitivity to the near-surface anomalies with the amplitude component probably showing more sensitivity to the shallow layers. A subset of the area, which is marked by a dotted rectangle 502, is further analyzed in terms of amplitude anomalies versus frequency as shown in FIGS. 6A-7B. The area to the right side of the wadi (East) is characterize by a dune field which introduce large amplitude residuals to be compensated.

The described refraction-based surface-consistent amplitude compensation can be applied as a function of frequency which enables the derivation for each source and receiver station of an operator describing amplitude variations versus frequency. The frequency-dependent operator is then deconvolved for each trace to implement a surface-consistent deconvolution which removes from the traces the contribution of the variable near surface. FIGS. 6A-6B illustrate a comparison between an amplitude residual map 600a evaluated at a central frequency of the data and a recalculated amplitude residual map 600b evaluated at the central frequency after applying a deconvolution process using a refraction-based surface-consistent operator of the described approach, according to some implementations. FIG. 6B illustrates that the anomalous amplitude variations observed in the raw data are eliminated effectively by using the described approach. Bar 602 depicts a mapping between gray-scale colors and a continuous range of amplitude residual values. The amplitude residual map 600b has values mostly around one, implying that each trace amplitude is now similar to the amplitude of the pilot trace (ratio between the two is around one). Therefore, the near-surface effects on amplitudes have been removed and the traces are now equalized.

Figures 7A, 7B:
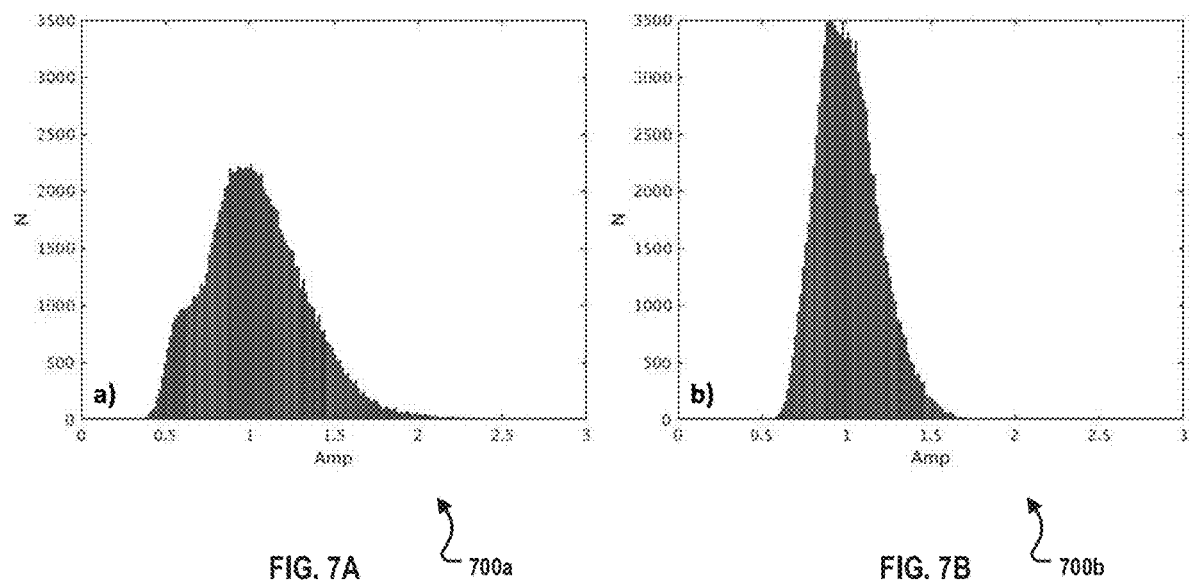
FIGS. 7A-7B illustrate a comparison between amplitude residual distributions before and after a deconvolution using a refraction-based surface-consistent operator of the described approach, according to some implementation.

FIGS. 7A-7B illustrate a comparison between amplitude residual distributions 700a and 700b before and after a deconvolution using a refraction-based surface-consistent operator of the described approach, according to some implementation. The amplitude residual histograms 700a and 700b represent before and after the deconvolution, respectively. FIG. 7B shows that the amplitude residual content of the data after deconvolution is more centered around the value of one (ratio around one) which represents that the near-surface effects on amplitudes have been removed and the traces are equalized.

Figure 8A:
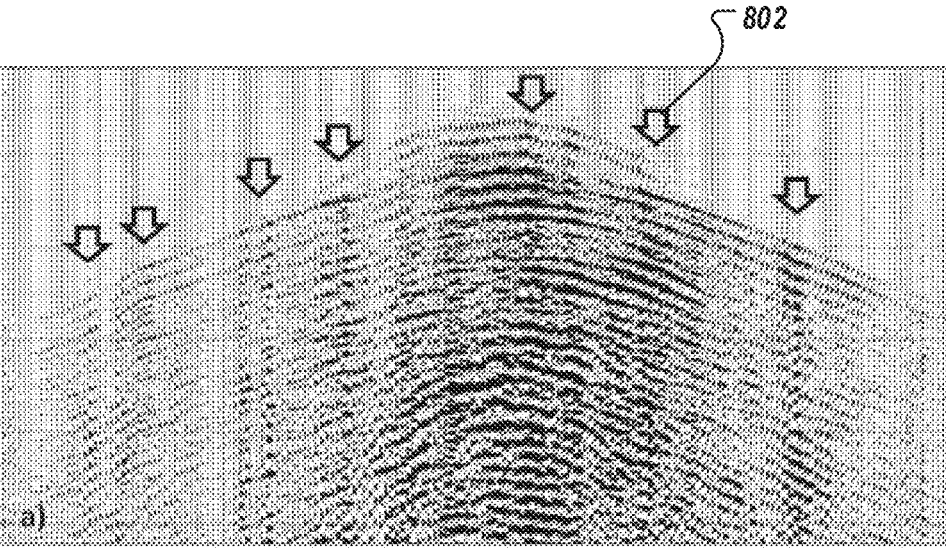
FIGS. 8A-8C illustrate effects of a deconvolution on shot gathers using a refraction-based surface-consistent operator of the described approach, according to some implementations.
Figure 8B:
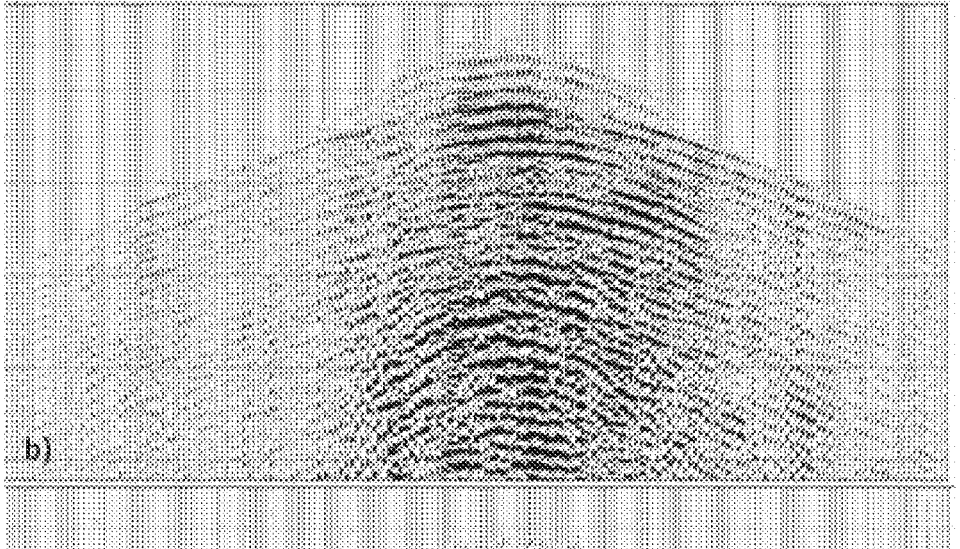
Figure 8C:
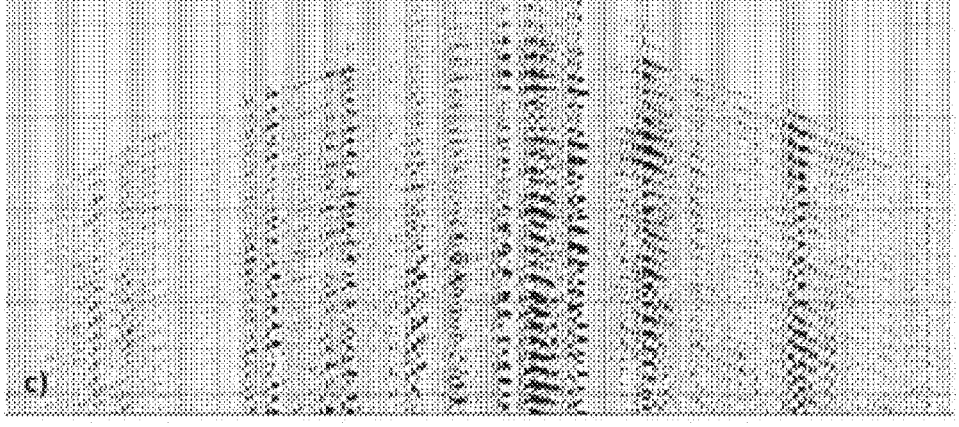

FIGS. 8A-8C illustrate effects of a deconvolution on shot gathers using a refraction-based surface-consistent operator of the described approach, according to some implementations. FIG. 8A shows a raw shot gather 800a displaying unbalanced amplitudes related to near-surface effects. For example, the unbalanced amplitudes are illustrated by arrows 802. FIG. 8B shows that after applying the deconvolution using the refraction-based surface-consistent operator, the amplitude imbalances are successfully removed and an enhanced distribution of amplitudes is provided. FIG. 8C shows a difference between the data in FIGS. 8A and 8B, illustrating that the described refraction-based surface-consistent amplitude residual balancing and deconvolution effectively equalizes the traces and removes the near-surface effects.

Figure 9:
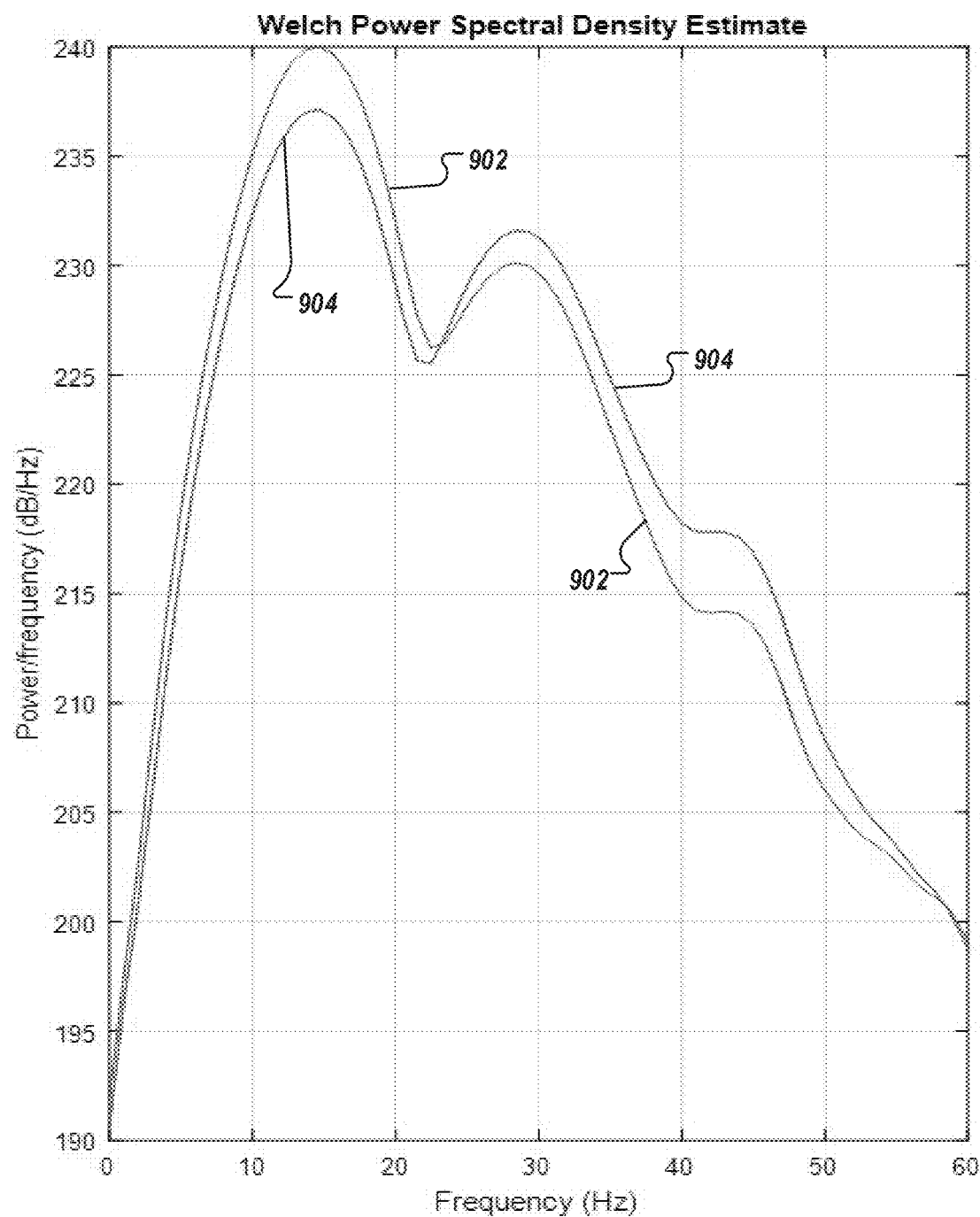
FIG. 9 illustrates a comparison between power spectra of a group of traces in FIGS. 8A and 8B before and after applying a refraction-based surface-consistent deconvolution operator, according to some implementations.

FIG. 9 illustrates a comparison between power spectra of a group of traces in FIGS. 8A and 8B before and after applying a refraction-based surface-consistent deconvolution operator, according to some implementations. The power spectrum curves 902 and 904 represent the power spectral density before and after applying the deconvolution operator, respectively. The power spectrum curve 904 shows that after applying the deconvolution operator, the spectrum has changed the shape with a reduction of power in the low-frequency range and an increase in the high frequency range.

Figure 10:
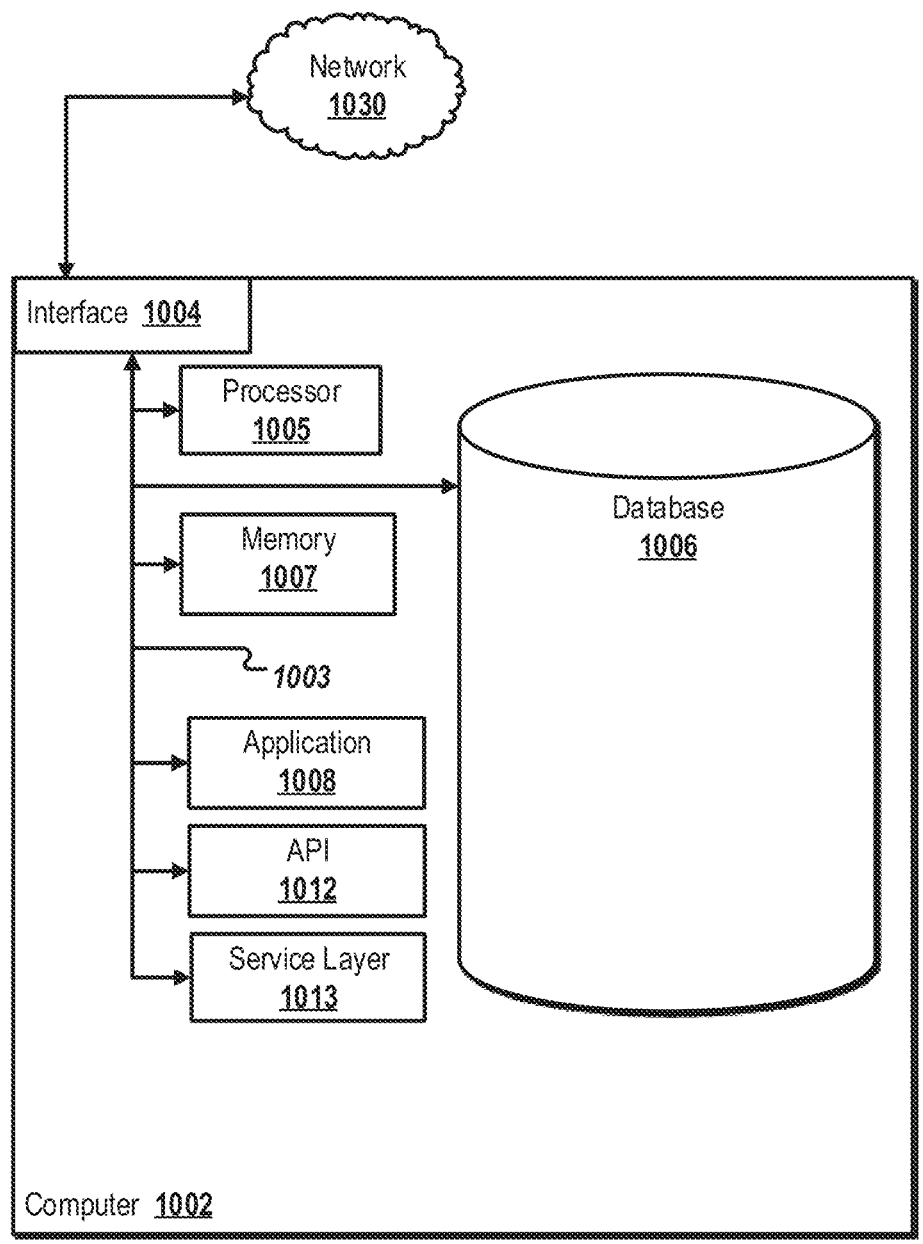
FIG. 10 is a block diagram illustrating an example computer system used to provide computational functionalities associated with described algorithms, methods, functions, processes, flows, and procedures as described in the instant disclosure, according to some implementations.

FIG. 10 is a block diagram of an example computer system 1000 used to provide computational functionalities associated with described algorithms, methods, functions, processes, flows, and procedures as described in the instant disclosure, according to some implementations. The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, or other server (or a combination of servers).

The computer 1002 can receive requests over network 1030 from a client application (for example, executing on another computer 1002) and responding to the received requests by processing the received requests using an appropriate software application(s). In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an application programming interface (API) 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems that are connected to the network 1030 (whether illustrated or not) in a distributed environment. Generally, the interface 1004 comprises logic encoded in software or hardware (or a combination of software and hardware) and is operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a database 1006 that can hold data for the computer 1002 or other components (or a combination of both) that can be connected to the network 1030 (whether illustrated or not). For example, database 1006 can be an in-memory, conventional, or other type of database storing data consistent with this disclosure. In some implementations, database 1006 can be a combination of two or more different database types (for example, a hybrid in-memory and conventional database) according to particular needs, desires, or particular implementations of the computer 1002 and the described functionality. Although illustrated as a single database 1006 in FIG. 10, two or more databases (of the same or combination of types) can be used according to particular needs, desires, or particular implementations of the computer 1002 and the described functionality. While database 1006 is illustrated as an integral component of the computer 1002, in alternative implementations, database 1006 can be external to the computer 1002. For example, the database 1006 can hold seismic data.

The computer 1002 also includes a memory 1007 that can hold data for the computer 1002 or other components (or a combination of both) that can be connected to the network 1030 (whether illustrated or not). For example, memory 1007 can be random access memory (RAM), read-only memory (ROM), optical, magnetic, and the like storing data consistent with this disclosure. In some implementations, memory 1007 can be a combination of two or more different types of memory (for example, a combination of RAM and magnetic storage) according to particular needs, desires, or particular implementations of the computer 1002 and the described functionality. Although illustrated as a single memory 1007 in FIG. 10, two or more memories 1007 (of the same or combination of types) can be used according to particular needs, desires, or particular implementations of the computer 1002 and the described functionality. While memory 1007 is illustrated as an integral component of the computer 1002, in alternative implementations, memory 1007 can be external to the computer 1002.

The application 1008 is an algorithmic software engine providing functionality according to particular needs, desires, or particular implementations of the computer 1002, particularly with respect to functionality described in this disclosure. For example, application 1008 can serve as one or more components, modules, or applications. Further, although illustrated as a single application 1008, the application 1008 may be implemented as multiple applications 1008 on the computer 1002. In addition, although illustrated as integral to the computer 1002, in alternative implementations, the application 1008 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method, comprising:
    receiving three-dimensional seismic traces, the three-dimensional seismic traces generated using at least one source and at least one receiver;
    determining, for each of a plurality of subsets of three-dimensional seismic traces, a respective pilot trace, wherein each subset is associated with a respective common offset;
    calculating for each trace, based on the respective pilot trace associated with the seismic trace, a refraction-based amplitude residual;
    inverting the amplitude residual for each seismic trace to determine refraction-based surface-consistent amplitude residuals for the at least one source and the at least one receiver; and
    performing refraction-based surface-consistent amplitude correction to each seismic trace by applying the determined refraction-based surface-consistent amplitude residuals for the at least one source and the at least one receiver.

2. The method of claim 1, further comprising sorting each of the seismic traces into a plurality of bins based on a midpoint and an offset between a source and a receiver associated with that seismic trace.

3. The method of claim 2, wherein the sorting is further based on an azimuth angle of that seismic trace.

4. The method of claim 2, wherein calculating the amplitude residual for each seismic trace comprises:
    for each of the plurality of bins:
        generating a pilot trace based on the seismic traces in that bin and a time window around a first arrival event; and
        calculating the amplitude residual for each seismic trace in that bin based on the pilot trace.

5. The method of claim 4, wherein the first arrival event is a refracted event.

6. The method of claim 4, wherein generating the pilot trace based on the seismic traces in that bin and the time window around the first arrival event comprises summing the seismic traces in that bin during the time window and dividing by a number of seismic traces in that bin.

7. The method of claim 4, wherein calculating the amplitude residual for each seismic trace in that bin based on the pilot trace comprises at least one of:
    calculating a ratio between an energy of that seismic trace and an energy of the pilot trace; or
    calculating a ratio between an amplitude of that seismic trace and an amplitude of the pilot trace.

8. The method of claim 1, wherein the determined surface-consistent amplitude residuals for the at least one source and the at least one receiver are a scalar or a function of frequency.

9. A system, comprising:
    a computer memory; and
    one or more hardware processor interoperably coupled with the computer memory and configured to perform operations comprising:
        receiving three-dimensional seismic traces, the three-dimensional seismic traces generated using at least one source and at least one receiver;
        determining, for each of a plurality of subsets of three-dimensional seismic traces, a respective pilot trace, wherein each subset is associated with a respective common offset;
        calculating for each trace, based on the respective pilot trace associated with the seismic trace, a refraction-based amplitude residual;
        inverting the amplitude residual for each seismic trace to determine refraction-based surface-consistent amplitude residuals for the at least one source and the at least one receiver; and
        performing refraction-based surface-consistent amplitude correction to each seismic trace by applying the determined refraction-based surface-consistent amplitude residuals for the at least one source and the at least one receiver.

10. The system of claim 9, wherein the operations further comprise sorting each of the seismic traces into a plurality of bins based on a midpoint and an offset between a source and a receiver associated with that seismic trace.

11. The system of claim 10, wherein calculating the amplitude residual for each seismic trace comprises:
    for each of the plurality of bins:
        generating a pilot trace based on the seismic traces in that bin and a time window around a first arrival event, wherein the first arrival event is a refracted event; and
        calculating the amplitude residual for each seismic trace in that bin based on the pilot trace.

12. The system of claim 11, wherein generating the pilot trace based on the seismic traces in that bin and the time window around the first arrival event comprises summing the seismic traces in that bin during the time window and dividing by a number of seismic traces in that bin.

13. The system of claim 11, wherein calculating the amplitude residual for each seismic trace in that bin based on the pilot trace comprises at least one of:
    calculating a ratio between an energy of that seismic trace and an energy of the pilot trace; or
    calculating a ratio between an amplitude of that seismic trace and an amplitude of the pilot trace.

14. The system of claim 9, wherein the determined surface-consistent amplitude residuals for the at least one source and the at least one receiver are a scalar or a function of frequency.

15. A non-transitory, computer-readable medium storing one or more instructions executable by a computer system to perform operations comprising:
    receiving three-dimensional seismic traces, the three-dimensional seismic traces generated using at least one source and at least one receiver;
    determining, for each of a plurality of subsets of three-dimensional seismic traces, a respective pilot trace, wherein each subset is associated with a respective common offset;
    calculating for each trace, based on the respective pilot trace associated with the seismic trace, a refraction-based amplitude residual;
    inverting the amplitude residual for each seismic trace to determine refraction-based surface-consistent amplitude residuals for the at least one source and the at least one receiver; and
    performing refraction-based surface-consistent amplitude correction to each seismic trace by applying the determined refraction-based surface-consistent amplitude residuals for the at least one source and the at least one receiver.

16. The non-transitory, computer-readable medium of claim 15, wherein the operations further comprise sorting each of the seismic traces into a plurality of bins based on a midpoint and an offset between a source and a receiver associated with that seismic trace.

17. The non-transitory, computer-readable medium of claim 16, wherein calculating the amplitude residual for each seismic trace comprises:
    for each of the plurality of bins:
        generating a pilot trace based on the seismic traces in that bin and a time window around a first arrival event, wherein the first arrival event is a refracted event; and
        calculating the amplitude residual for each seismic trace in that bin based on the pilot trace.

18. The non-transitory, computer-readable medium of claim 17, wherein generating the pilot trace based on the seismic traces in that bin and the time window around the first arrival event comprises summing the seismic traces in that bin during the time window and dividing by a number of seismic traces in that bin.

19. The non-transitory, computer-readable medium of claim 17, wherein calculating the amplitude residual for each seismic trace in that bin based on the pilot trace comprises at least one of:
    calculating a ratio between an energy of that seismic trace and an energy of the pilot trace; or
    calculating a ratio between an amplitude of that seismic trace and an amplitude of the pilot trace.

20. The non-transitory, computer-readable medium of claim 15, wherein the determined surface-consistent amplitude residuals for the at least one source and the at least one receiver are a scalar or a function of frequency.

* * * * *